(12) United States Patent
Wang et al.

(10) Patent No.: US 9,392,001 B2
(45) Date of Patent: *Jul. 12, 2016

(54) MULTILAYERED DECEPTION FOR INTRUSION DETECTION AND PREVENTION

(71) Applicant: AT&T Intellectual Property I, L.P., Atlanta, GA (US)

(72) Inventors: Wei Wang, Weehawken, NJ (US); Qi Shen, New York, NY (US); Andrea Forte, Brooklyn, NY (US); Jeffrey Bickford, Somerset, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/283,248

(22) Filed: May 21, 2014

(65) Prior Publication Data

US 2014/0259172 A1    Sep. 11, 2014

Related U.S. Application Data

(63) Continuation of application No. 13/311,608, filed on Dec. 6, 2011, now Pat. No. 8,739,281.

(51) Int. Cl.
*H04L 29/06* (2006.01)
*G06F 15/16* (2006.01)
*G06F 21/55* (2013.01)
*G06F 21/56* (2013.01)

(52) U.S. Cl.
CPC .............. *H04L 63/14* (2013.01); *G06F 21/552* (2013.01); *G06F 21/566* (2013.01); *H04L 63/1491* (2013.01)

(58) Field of Classification Search
None
See application file for complete search history.

(56) References Cited

U.S. PATENT DOCUMENTS

| | | | |
|---|---|---|---|
| 7,624,274 B1 | 11/2009 | Alspector et al. | |
| 7,665,134 B1 * | 2/2010 | Hernacki et al. | 726/22 |
| 7,802,304 B2 | 9/2010 | Rao et al. | |
| 7,831,522 B1 * | 11/2010 | Satish | G06Q 20/02 705/76 |
| 7,870,608 B2 | 1/2011 | Shraim et al. | |
| 7,917,593 B1 * | 3/2011 | Lee | G06Q 10/107 709/206 |
| 8,381,291 B2 | 2/2013 | Wood | |
| 8,739,281 B2 * | 5/2014 | Wang et al. | 726/22 |
| 2004/0128529 A1 * | 7/2004 | Blake et al. | 713/200 |
| 2004/0128543 A1 * | 7/2004 | Blake et al. | 713/201 |
| 2005/0257261 A1 * | 11/2005 | Shraim et al. | 726/22 |
| 2006/0015561 A1 | 1/2006 | Murphy et al. | |

(Continued)

OTHER PUBLICATIONS

VelocityReviews, www.velocityreviews.com/forums/t304547-honeypot-file.html, retrieved Oct. 28, 2011. 2 pages.

(Continued)

*Primary Examiner* — Christopher Revak
(74) *Attorney, Agent, or Firm* — Hartman & Citrin LLC

(57) ABSTRACT

Concepts and technologies are disclosed herein for multilayered deception for intrusion detection. According to various embodiments of the concepts and technologies disclosed herein, a multilayer deception system includes honey servers, honey files and folders, honey databases, and/or honey computers. A multilayer deception system controller generates honey activity between the honey entities and exposes a honey profile with contact information associated with a honey user. Contact directed at the honey user and/or activity at any of the honey entities can trigger alarms and/or indicate an attack, and can be analyzed to prevent future attacks.

20 Claims, 6 Drawing Sheets

(56) References Cited

U.S. PATENT DOCUMENTS

| | | | |
|---|---|---|---|
| 2006/0068755 A1 | 3/2006 | Shraim et al. | |
| 2007/0107053 A1 | 5/2007 | Shraim et al. | |
| 2008/0071808 A1* | 3/2008 | Hardt | G06F 17/243 |
| 2008/0104700 A1* | 5/2008 | Fagone et al. | 726/22 |
| 2008/0196099 A1 | 8/2008 | Shastri | |
| 2009/0328216 A1* | 12/2009 | Rafalovich et al. | 726/23 |
| 2011/0029618 A1 | 2/2011 | Lavy et al. | |
| 2011/0145922 A1* | 6/2011 | Wood | H04L 51/12 726/24 |
| 2011/0179487 A1* | 7/2011 | Lee | H04L 12/585 726/23 |
| 2011/0296003 A1* | 12/2011 | McCann | G06F 21/316 709/224 |
| 2011/0313930 A1 | 12/2011 | Bailey, Jr. | |
| 2012/0151211 A1* | 6/2012 | Kreiner | H04L 63/102 713/168 |
| 2012/0167208 A1 | 6/2012 | Buford et al. | |

OTHER PUBLICATIONS

Wikipedia, "Honeypot (computing)," http://en.wikipedia.org/wiki/Honeypot_(computing), retrieved Oct. 28, 2011. 4 pages.

Cisco Systems, "Observations of Login Activity in an SSH Honeypot," www.cisco.com/web/about/security/intelligence/ssh-security.html, retrieved Oct. 28, 2011. 5 pages.

Webopedia Computer Dictionary, "Honeypot," www.webopedia.com/TERM/honeypot.html, retrieved Oct. 28, 2011. 2 pages.

Balduzzi, M. et al., "Abusing Social Networks for Automated User Profiling," Eurecom, Research Report RR-10-233—Mar. 3, 2010.

Lee, K. et al., "Uncovering Social Spammers: Social Honeypots + Maching Learning," SIGIR '10, Jul. 19-23, 2010.

Webb, S. et al., "Social Honeypots: Making Friends with a Spammer Near You," Conference on Email and Anti-Spam (CEAS 2008), 2008.

Lee, K. et al., "The Social Honeypot Project: Protecting Online Communities from Spammers," WWW '10 Proceedings of the 19th international conference on World wide web, Apr. 26-30, 2010.

Project Honey Pot, www.projecthoneypot.org retrieved Nov. 4, 2011. 1 page.

Rowe, N.C., "Measuring the Effectiveness of Honeypot Counter-Counterdeception," ICSS '06. Proceedings of the 39th Annual Hawaii International Conference on System Sciences, 2006. Jan. 4-7, 2006.

U.S. Office Action mailed on Mar. 25, 2013 in U.S. Appl. No. 13/311,608.

U.S. Office Action mailed on Oct. 10, 2013 in U.S. Appl. No. 13/311,608.

U.S. Notice of Allowance mailed on Jan. 2, 2014 in U.S. Appl. No. 13/311,608.

* cited by examiner

MULTILAYERED DECEPTION FOR INTRUSION DETECTION AND PREVENTION

CROSS-REFERENCE TO RELATED APPLICATIONS

This application is a continuation of U.S. patent application Ser. No. 13/311,608, entitled "Multilayered Deception for Intrusion Detection and Prevention," filed on Dec. 6, 2011, now U.S. Pat. No. 8,739,281, which is incorporated herein by reference in its entirety.

BACKGROUND

This application relates generally to network security. More specifically, the disclosure provided herein relates to multilayered deception for intrusion detection and prevention.

Computer attacks are becoming increasingly sophisticated. Some attackers create attacks that operate over long periods of time and from multiple attack vectors. In some attacks, a computer intrusion is launched using a single event such as a phishing message or spear-phishing message to infect a computer of an employee or representative of a targeted organization. Thus, for example, attackers may send a phishing email or malware attachment to an employee of a company via email. When the employee opens or executes the mail or message attachment, the computer may be compromised and key loggers, viruses, worms, and/or other threats may be initiated at the target computer.

Detecting malicious activities, such as data exfiltration, can be a complex task that may require tracking network traffic data and/or log analysis. As mentioned above, the attacks sometimes can be initiated by a user clicking on a link or executable script or macro within a single email or message. As such, these and other types of threats sometimes are not detected until data has already been exploited by the attack. In other instances, the attacks are not detected until the attack has already ended.

SUMMARY

The present disclosure is directed to multilayered deception for intrusion detection and prevention. According to various embodiments of the concepts and technologies disclosed herein, a multilayer deception system controller operates on a private network such as a local network, a corporate intranet, or other network. The private network can be configured to communicate with, or allow access from, devices on a public network such as the Internet. An attacker may identify a user associated with the private network as a target for an attack. The user may be identified by the attacker based, for example, upon a position or title at a company or due to other considerations. The multilayer deception system controller is configured to identify possible or probable targets of attacks and to protect the targets from exploitation using multiple layers of deception.

In some embodiments, the multilayer deception system controller is configured to create a honey user and a honey profile for the honey user. A "honey user" can include, but is not limited to, a representation of a user. In some instances, the honey user is a software representation of the user and is based, completely or at least in part, upon a real user identified as a probable or possible target of an attack. The multilayer deception system controller can generate a honey profile for the user based, at least partially, upon a real profile for the real user. As such, the honey user can appear, from the honey profile, to be the same person as the real user. The honey profile can be exposed to a public network. In some embodiments, for example, the honey profile can be uploaded to a social networking site. Thus, attackers may target the honey user instead of, or in addition to, the real user, thus redirecting possible attacks away from, and protecting, the user.

The multilayer deception system controller also can be configured to generate various honey entities for emulating a computing environment associated with the real user and/or intercepting attacks targeted at the real user. The honey entities can include, for example, honey computers, honey files and folders, honey servers, and/or honey databases. The multilayer deception system controller also can generate honey activity between the honey entities to further deceive malicious attackers and/or attacks. The honey entities and honey activity can be hosted and/or executed by dedicated real or virtual resources, or hosted by resources associated with real entities such as a computer, server, database, files and folders, and the like. In some embodiments, the various honey entities are configured to operate independently as multiple layers of traps for malicious attacks. In other embodiments, the various honey entities cooperate to provide a coordinated multilayered trap for attacks. For example, in some embodiments attacks targeted at the honey profile can be routed to the honey entities automatically. In other embodiments, the honey entities operate on real resources such as users' computers, and are used to trap attacks before the attacks exploit real resources. In either or both embodiments, the honey entities can be used to identify and/or isolate the attack from other entities in the network including, for example, the real entities associated with the real user. The multilayer deception system controller can be configured to generate and track alarm conditions and/or to modify access thresholds that can be used to identify activity as malicious or legitimate.

According to one aspect of the concepts and technologies disclosed herein, a method is disclosed. The method can include generating a honey entity and an instance of honey activity associated with the honey entity at a private network. The method also can include generating a honey profile for the honey user, exposing the honey profile outside of the private network, detecting an interaction with the honey entity, and analyzing the interaction to determine if the interaction corresponds to an attack.

According to various embodiments, the method also includes generating the honey profile associated with the honey user based, at least partially, upon a real profile of a real user associated with the private network. The real profile can include a first version of contact information and the honey profile can include a second version of the contact information. In some instances, exposing the honey profile outside the private network includes uploading information associated with the honey profile to a social networking service. Generating the honey entity can include generating a honey server at the private network. Generating the honey entity can include generating a honey file, and the instance of honey activity can include activity between the honey file and a computer operating on the private network.

In some embodiments, the computer can include a honey computer that can be isolated from the real user. In some instances, the attack includes a spear-phishing email intended for delivery to a further computer associated with the real user and the spear-phishing email is routed to the multilayer deception system controller or the honey computer by a mail server based, at least partially, upon contact information associated with the honey profile. The method also can include determining if an interaction threshold is satisfied by the interaction, and in response to determining that the interaction threshold is satisfied, determining that the interaction corresponds to the attack, triggering an alarm indicating that the attack is in progress, blocking the attack, and propagating information relating to the attack to a further entity within the private network. The method also can include determining if the threshold is to be adjusted based, at least partially, upon a determination that the alarm includes a false alarm.

According to another aspect of the concepts and technologies disclosed herein, a multilayer deception system controller is disclosed. The multilayer deception system controller can include a processor configured to execute computer-executable instructions stored in a memory to execute a method including identifying a real user as a target of an electronic attack and generating a honey profile for a honey user. The honey profile can include a first version of contact information that differs from a second version of contact information associated with the real user. The method executed by the multilayer deception system controller also can include generating a honey file, and an instance of honey activity between a computer operating on the private network and the honey file, exposing the honey profile on a public network, detecting an interaction with the honey file, and determining, based upon detecting the interaction with the honey file, if the interaction corresponds to the electronic attack.

According to some embodiments, the processor is further configured to execute the computer-executable instructions to upload the honey profile to a social networking server accessible via the public network. In some embodiments, the processor is further configured to execute the computer-executable instructions to instruct a mail server associated with the private network to route communications directed to an email address associated with the honey profile to a honey computer or to a multilayer deception system controller. The processor also can be configured to execute the computer-executable instructions to trigger an alarm in response to determining that the interaction corresponds to the electronic attack. According to some implementations, the processor is further configured to execute the computer-executable instructions to trigger an alarm, in response to detecting the interaction with the honey file, analyze the interaction to determine if an interaction threshold is satisfied by the interaction, and in response to determining that the interaction threshold is satisfied, determine that the interaction corresponds to the attack, block the attack, and propagate information relating to the attack to a further entity within the private network.

According to another embodiment, the processor is further configured to execute the computer-executable instructions to trigger an alarm, in response to detecting the interaction with the honey file, to analyze the interaction to determine if an interaction threshold is satisfied by the interaction, to determine that that the threshold is to be adjusted based, at least partially, upon determining that the threshold is satisfied and determining that the interaction does not correspond to the attack, and to adjust the threshold. The processor also can be configured to execute the computer-executable instructions to upload the honey profile to a social networking server accessible via the public network. The social networking server can be configured to store social networking data including a profile associated with the real user.

According to yet another aspect, a computer storage medium is disclosed. The computer storage medium has computer-executable instructions stored thereon that, when executed by a multilayer deception system controller, cause the multilayer deception system controller to execute a method including determining that a real user of a private network is a target of an attacker, generating a honey user and a honey profile for the honey user, the honey profile including a first version of contact information that differs from a second version of contact information associated with a real profile of the real user, exposing the honey profile outside of a private network associated with the real user, hosting a honey file at the private network, generating an instance of honey activity between a computer operating on the private network and the honey file, detecting an interaction with the honey file, and determining, based upon detecting the interaction with the honey file, if the interaction corresponds to an attack by the attacker.

In some embodiments, the honey profile is exposed by uploading the honey profile to a social networking server accessible via the public network. The social networking server can be configured to store social networking data including the real profile. According to various embodiments, the computer storage medium further includes computer-executable instructions that, when executed by the multilayer deception system controller, cause the multilayer deception system controller to instruct a mail server operating in communication with the private network to route a message intended for an email address associated with the honey profile to the computer, wherein the computer includes a honey computer or a multilayer deception system controller, to detect routing of the message to the honey computer, to analyze the message to determine if the message includes the attack, and to trigger an alarm, in response to determining that the message includes the attack. In some embodiments, the computer storage medium further includes computer-executable instructions that, when executed by the multilayer deception system controller, cause the multilayer deception system controller to block the attack, and propagate information associated with the attack to other entities associated with the private network.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure, and be protected by the accompanying claims.

DETAILED DESCRIPTION

Figure 1:
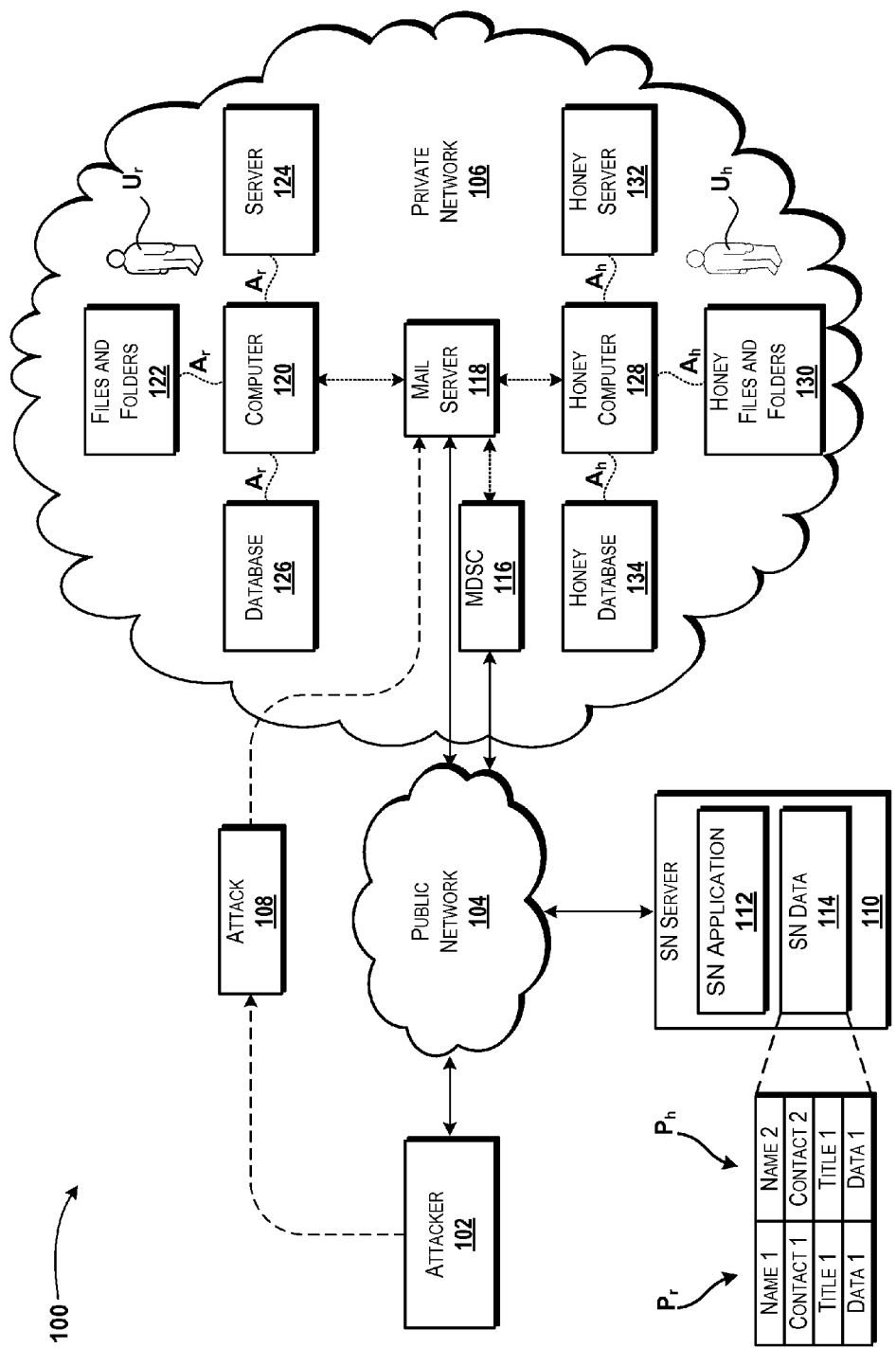
FIG. 1 is a system diagram illustrating an illustrative operating environment for the various embodiments disclosed herein.

The following detailed description is directed to multilayered deception for intrusion detection and prevention. According to various embodiments of the concepts and technologies disclosed herein, a multilayer deception system controller operates on a private network. The private network can be configured to communicate with or can be accessible via a public network such as the Internet. An attacker may identify a user associated with the private network as a target for an electronic attack. The multilayer deception system controller is configured to identify possible or probable targets of electronic attacks and to protect the targets from exploitation using one or more honey entities.

In some embodiments, the multilayer deception system controller identifies a target and generates a honey user and a honey profile for the honey user. The honey profile can be based, at least partially, upon a real profile for the real user. As such, an attacker viewing the honey profile can mistake the honey user for the real user. The honey profile is exposed to public network, for example, by uploading the honey profile to a social networking site, by publishing documents such as business cards with information from the honey profile, and/or via other mechanisms. As such, attackers may target attacks at the honey user instead of the real user, thereby providing a first layer of deception and protection for the real user and his or her associated resources. The multilayer deception system controller also is configured to generate various honey entities for emulating and/or otherwise obfuscating a computing environment associated with the real user. The honey entities can include honey computers, honey files and folders, honey servers, and/or honey databases.

The multilayer deception system controller also can generate honey activity between the honey entities to further deceive malicious attackers and/or attacks. The honey entities and honey activity can be hosted and/or executed by dedicated real or virtual resources, or hosted by resources associated with real entities such as a computer, server, database, files and folders, and the like. When an attacker targets a real user or a honey user identified via the honey profile, the attack can be blocked by the various layers of protection provided by the honey entities. In addition to the layer of protection afforded by the honey user, the honey entities can provide other layers of protection. For example, an email address exposed in the honey profile can automatically be routed to the honey computer or to the multilayer deception system controller.

In other embodiments, attacks that reach the real user and/or his or her associated resources can be tricked into attacking the various honey entities instead of real resources. For example, malicious code may be fooled by the honey activity into focusing on honey folders, honey files, honey databases, and/or honey servers instead of, or in addition to, the real files, folders, databases, and/or servers. The honey entities thus can be used to identify and/or isolate the attack from other entities in the network including, for example, the real entities associated with the real user. In some embodiments, any access detected with respect to the honey entities can trigger an alarm condition and/or can be interpreted as an attack. The multilayer deception system controller can be configured to generate and track alarm conditions and/or to modify access thresholds that can be used to identify activity as malicious or legitimate.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1, aspects of an operating environment 100 for various embodiments of the concepts and technologies disclosed herein for a verification service for providing data delivery with sender verification will be described, according to an illustrative embodiment. The operating environment 100 shown in FIG. 1 includes an attacker 102. The attacker 102 can use, or can be, a device operating in communication with a public communications network ("public network") 104. Because electronic attacks are generally launched using electronic devices, the attacker 102 refers to the user and/or a user device utilized by the attacker to launch an attack 108 on a target. It should be understood that this embodiment is illustrative, and should not be construed as being limiting in any way.

As mentioned above, the attacker 102 resides on or makes use of the private network 106. According to embodiments, the functionality of the public network 104 can be provided, for example, by the Internet, by other wide area networks ("WAN"), and/or by other networks. It should be understood that the public network 104 may or may not be accessible to the general public. Rather, as used herein a "public network" such as the public network 104 can include any network that is accessible to the attacker 102 in addition to a target of the attacker 102, as will be more clearly understood below.

According to various embodiments, a private network 106 exists in communication with and/or is accessible via the public network 104. According to implementations, the functionality of the private network 106 is provided by an intranet, a personal area network ("PAN"), a Local Area Network ("LAN"), or other limited access network. In some embodiments, the functionality of the private network 106 is provided by a virtual private network ("VPN") that can use and/or rely upon the public network 104 to grant users access. As such, for purposes of understanding the concepts and technologies disclosed herein, it should be understood that the public network 104 includes a network accessible to the attacker 102 and a target of the attacker 102, and the private network 106 includes a network accessible only to the target, but not the attacker 102. It should be understood that this embodiment is illustrative, and should not be construed as being limiting in any way.

According to some implementations of the concepts and technologies disclosed herein, the operating environment 100 also includes a social networking server 110 ("SN server") operating on or in communication with the public network 104. The SN server 110 can be configured to execute a social networking application 112 ("SN application") to provide social networking services to users and devices accessing the SN server 110 via the public network 104. According to various implementations of the concepts and technologies disclosed herein, the social networking services provided by the SN server 110 include, but are not limited to, the FACEBOOK social networking service, the LINKEDIN professional networking service, the TWITTER messaging service, other social networking services, or the like. In other embodiments, social networking functionality is provided by other services, sites, and/or providers that are not necessarily known as social networking service providers. As such, the functionality of the SN server 110 should be understood as including various services, sites, and/or applications that enable or allow users to interact via email, comment threads, ratings and reviews, messages, chat services, gameplay, blogging services, microblogging services, or other mechanisms. As such, it should be appreciated that the above list of social networking services is not exhaustive, as numerous social networking services are not described herein.

According to implementations, the SN application 112 generates and/or hosts social networking data 114 ("SN data") associated with one or more users. The SN data 114 describes, for example, social networking connections associated with users; user content such as status updates, reviews, photographs, links, and the like; contact and biographical information associated with users; usage history and statistics; likes and dislikes; comments; connection requests; or the like. According to various embodiments, the SN data 114 includes a number of user profiles. The profiles can include name information, contact information, resume information, company and title information, responsibilities of users, other information, or the like. As shown in FIG. 1, the SN data 114 includes, in some embodiments, a real profile for a user, denoted as $P_r$, and a honey profile for a user, denoted as $P_h$.

As shown in FIG. 1, the real profile $P_r$ can include a name, contact information, company information, and other data. The honey profile $P_h$ can include the same information. As shown, however, the name and contact information for the user associated with the real profile $P_r$ and honey profile $P_h$ can differ. In particular, as will be explained in greater detail below, particularly with reference to FIGS. 2-4, the honey profile $P_h$ can include contact information associated with a multilayered deception scheme. The honey profile $P_h$ thus can be used to provide a first layer of protection from attacks 108 by tricking an attacker 102 into attacking an entity associated with the honey profile $P_h$ instead of, or in addition to, attacking an entity associated with the real profile $P_r$. These and other aspects of the honey profile $P_h$ are described in more detail below.

According to various implementations, the operating environment 100 includes a multilayer deception system controller 116 that operates as a part of or in communication with the private network 106. According to various embodiments, the multilayer deception system controller 116 also can access the public network 104 via the private network 106. The functionality of the multilayer deception system controller 116 can be provided by one or more server computers, virtual server computers, and/or other real or virtual computing resources. According to various implementations, the multilayer deception system controller 116 stores, executes, and/or hosts a multilayer deception system controller application (not shown in FIG. 1) for providing the functionality described herein for a multilayer deception system.

The operating environment also includes a mail server 118. The mail server 118 is configured to deliver messages, attachments, and/or other data to one or more mail recipients within the private network 106, and to send mail, attachments, and/or other data from users within the private network 106 to the public network 104 and/or other systems, networks, and/or devices. As such, the mail server 118 is exposed, in various embodiments, to the public network 104 to enable the mail server 118 to communicate with the public network 104. It should be understood that this embodiment is illustrative, and should not be construed as being limiting in any way.

In the embodiment illustrated in FIG. 1, various entities exist within or in communication with the private network 106. For example, the operating environment 100 includes various resources that can be used by a user, denoted in FIG. 1 as $U_r$. For example, the user $U_r$ can use a computer 120 for various purposes. According to various embodiments, the user $U_r$ interacts with files and folders 122, a server 124, and/or data stores or databases ("database") 126 in communication with the computer 120 on the private network 106. As shown in FIG. 1, the user $U_r$ can interact with these and other resources by way of activity $A_r$. The activity $A_r$ of the user $U_r$ may include opening files stored as the files and folders 122, accessing applications, scripts, and/or programs hosted by the server 124, and/or running queries against and/or accessing data stored by the database 126. It should be understood that other activity that is related to business or personal affairs of the user $U_r$ can be conducted on or through the private network 106. As such, it should be understood that the above examples of the activity $A_r$ are illustrative, and should not be construed as being limiting in any way.

The attacker 102 can identify the user $U_r$ as a target, and can launch an attack 108 against the user $U_r$. According to some embodiments, the attack 108 includes an advanced persistent threat ("APT") whereby the attacker 102 targets the user $U_r$. APT attacks or other forms of intrusion attacks may begin with a single spear-phishing email or other mechanism for infecting a computer used by the user $U_r$, in this case, the computer 120. For purposes of describing the concepts and technologies disclosed herein, the disclosure herein describes the attack 108 as beginning with a spear-phishing email targeted at the user $U_r$. Because the attack 108 can begin using other mechanisms, it should be understood that this embodiment is illustrative, and should not be construed as being limiting in any way.

In the above embodiment, wherein the attack 108 commences with a spear-phishing email, the email is routed to the mail server 118, and from there to the computer 120. The attack 108 can include key loggers and/or other sophisticated mechanisms for logging and/or repeating the activity $A_r$ performed by the computer 120. As such, the attack 108 can compromise data stored in the files and folders 122, applications, programs, and/or other information hosted by the server 124; and/or data, queries, and/or results from interactions with the database 126. It should be understood that this embodiment is illustrative, and should not be construed as being limiting in any way.

As will be described in more detail herein, particularly with reference to FIGS. 2-4, the multilayer deception system controller 116 is configured, via execution of various application programs such as an multilayer deception system controller application (not shown in FIG. 1) to provide, manage, and control a multilayered deception system for avoiding, mitigating, and/or blocking advanced persistent threat attacks and/or other attacks 108 targeted at users of the private network 106. The multilayer deception system includes, for example, creation and management of various honey entities that can be executed by the users' resources and/or by other resources on the private network 106. As will be more clearly understood below, the honey entities can therefore be used to trap the attacks 108 that reach the user $U_r$ and/or to deflect attacks from the resources associated with the user $U_r$ to the various honey entities.

As used herein, entities modified by the word "honey" include virtual or real entities that emulate and/or appear to provide real functionality associated with their non-honey counterparts. The honey entities can be used to deceive an attacker 102 and/or software included in an attack 108. Thus, for example, a honey user $U_h$ can include a virtual person provided by software and/or other functionality. While the honey user $U_h$ is not a real entity, the honey user $U_h$ can appear to be a real entity to the attacker 102 and/or the attack 108. As such, in some instances the attack 108 is occupied by the honey user $U_h$ and/or "resources" associated with the honey user $U_h$, which actually are honey entities, instead of the real user $U_r$. In other instances, the honey entities are executed by resources associated with the real user $U_r$ to trap the attacks 108 before the attacks 108 exploit the resources. These and other aspects of the honey entities are described in more detail below.

According to embodiments, the honey entities include, but are not limited to, a honey computer 128, honey files and folders 130, a honey server 132, a honey database 134, and the honey profile $P_h$ mentioned above with regard to the SN data 114. The multilayer deception system controller 116 also can create, manage, and expose honey activity $A_h$ between the honey computer 128, the honey files and folders 130, and/or the honey database 134. While the various honey entities are illustrated as being separate from the real entities, it should be understood that the honey entities can be executed by software on the computer 120. Each of these honey entities is now described in additional detail.

The honey computer 128 can include a real or virtual computer that appears, to an attacker 102 or software included in the attack 108, to be a computer or computing resource belonging to the user $U_r$. In some embodiments, the functionality of the honey computer 128 is omitted, and the multilayer deception techniques disclosed herein rely upon usage of the computer 120 instead of, or in addition to, the honey computer 128. In yet other embodiments, the honey computer 128 is omitted, but the functionality of the honey computer 128 as described herein is provided by the computer 120. In other embodiments, such as the embodiment illustrated in FIG. 1, the honey computer 128 is a real or virtual computer that is provided to insulate the computer 120 from the attacker 102. Because the honey computer 128 can be omitted in various embodiments, it should be understood that this embodiment is illustrative, and should not be construed as being limiting in any way.

The honey computer 128 can provide a layer of protection against the attacks 108 and can operate in conjunction with, or independently of, the honey files and folders 130, the honey server 132, and/or the honey databases 134. The honey computer 128 can provide real or virtual resources that appear, to an attacker 102 or attack 108, to be identical to the computer 120. For example, the honey computer 128 can access the honey server 132, the honey files and folders 130, the honey database 134, and/or other resources via honey activity $A_h$. In some embodiments, the mail server 118 is configured, via instructions issued by the multilayer deception system controller 116, to route email or other messages directed to the honey profile $P_h$ to the honey computer 128 or to the multilayer deception system controller 116 instead of the computer 120. Thus, spear-phishing emails, malicious scripts and/or macros, as well as other malicious content directed to the honey profile $P_h$ can be directed to the honey computer 128 instead of the computer 120. In other embodiments, as mentioned above, the honey computer 128 is omitted and emails directed to the honey profile $P_h$ are either routed to the multilayer deception system controller 116 or are not routed anywhere and instead are deflected from real users $U_r$ by way of the honey profile $P_h$. In some embodiments, the honey profile $P_h$ includes an email address that is not associated with any person or user. In yet other embodiments, as shown in FIG. 1, the email address included in the honey profile $P_h$ is associated with the honey user $U_h$ and can be, but is not necessarily, directed to the honey computer 128 upon receipt by the mail server 118. It should be understood that this embodiment is illustrative, and should not be construed as being limiting in any way.

The honey files and folders 130 can provide another layer of protection against the attacks 108 and can operate in conjunction with, or independently of, the honey computer 128, the honey server 132, and/or the honey databases 134. The honey files and folders 130 can include false files and/or folders provided by real or virtual resources within the private network 106. As noted above, the honey files and folders 130 can be provided by the computer 120. The honey files and folders 130 do not include any information that legitimate users need or desire to access. As such, the multilayer deception system controller 116 can be configured to monitor the honey files and folders 130 for any access by any entity. Any access of honey files and folders 130 can be understood by the multilayer deception system controller 116 as being prompted by a hacker or other attack 108. As such, the multilayer deception system controller 116 can be configured to trigger one or more alarms upon detection of any operations on the honey files and folders 130 including, but not limited to, reading, opening, moving, copying, or otherwise accessing the honey files and folders 130. The honey files and folders 130 can be stored on the honey computer 128 and/or on real computers, mobile phones, or other resources associated with a real user $U_r$. As such, in some embodiments, the honey files and folders 130 are stored on the computer 120 and monitored by software running on the computer 120 and/or the multilayer deception system controller 116. It should be understood that these embodiments are illustrative, and should not be construed as being limiting in any way.

The honey server 132 can provide another layer of protection against the attacks 108 and can operate in conjunction with, or independently of, the honey computer 128, the honey files and folders 130, and/or the honey databases 134. The honey server 132 can include one of two types of real or virtual server computers or other resources. In some embodiments, the honey server 132 is configured to store and host only fake or false data such as applications, web pages, and the like. Thus, the multilayer deception system controller 116 can monitor the honey server 132, or the honey server 132 can be configured to self-report to the multilayer deception system controller 116, if any access is detected at the honey server 132. Access can include any access of the honey server 132, any connection attempt including an SSH or FTP attempt, or other interactions with the honey server 132. Again, as noted above, the functionality of the honey server 132 can be provided by the real resources discussed above including, but not limited to, the computer 120.

In some embodiments, for example, the functionality of the honey server 132 is provided by real or virtual resources used to provide the server 124. Thus, the honey server 132 can be provided by the same hardware used to provide the server 124. As such, the honey server 132 can be configured to trap attacks 108 that reach the real user $U_r$ and/or resources associated with the real user $U_r$ by trapping the attacks 108 when the attacks 108 try to access the honey server 132. In some embodiments, the honey server 132 runs a false alarm reduction algorithm for differentiating between honey activity $A_h$ with the honey server 132 and activity associated with the attack 108. As such, the honey server 132 can be configured to reduce false alarms caused by the honey activity $A_h$ described below. The reduction of false alarms on the second type of honey server 132 is described in more detail below, at least with regard to FIG. 4.

The honey database 134 can provide another layer of protection against the attacks 108 and can operate in conjunction with, or independently of, the honey computer 128, the honey files and folders 130, and/or the honey server 132. The honey database 134 can include fake databases and/or fake tables, fake rows, fake columns, and/or other fake database components in a real database such as the database 126. In some embodiments, the honey database 134 is housed by the database 126 and/or the computer 120. In other embodiments, the honey database 134 is provided by a real or virtual resource remote from the computer 120 and/or database 126 to insulate the computer 120 and/or database 126 from the attack 108. The honey database 134 can be monitored by the multilayer deception system controller 116 to detect access to the fake database and/or fake database components. The multilayer deception system controller 116 can be configured to trigger one or more alarms upon detecting any activity at the honey database 134.

The honey profile $P_h$ mentioned above with regard to the SN data 114 can provide another layer of protection against the attacks 108 and can operate in conjunction with, or independently of, the honey computer 128, the honey files and folders 130, the honey server 132, and/or the honey databases 134. The honey profile $P_h$ can include profiles for honey users such as the honey user $U_h$. The honey profile $P_h$ can mirror all or most of a real profile $P_r$ of the real user $U_r$, though some changes can be made. For example, in some embodiments, the honey profile $P_h$ is identical to a real profile $P_r$ of the real user $U_r$, except for name and contact information, which may be changed. Thus, an attacker 102 who identifies the honey profile $P_h$ as a target of an attack 108 can direct a spear-phishing email, phishing SMS message, code, links, executables, script, macros, or other potentially malicious content to the honey user $U_h$. Thus, the honey profile $P_h$ can be used to deflect attacks from the real user $U_r$ to a non-existent, and therefore safe, honey user $U_h$. In some embodiments, the mail server 118 can be configured to direct communications intended for the honey user $U_h$ to the honey computer 128 for management of the threat, though this is not necessarily the case.

The honey activity $A_h$ can provide yet another layer of protection against the attacks 108 and can operate in conjunction with, or independently of, the honey computer 128, the honey files and folders 130, the honey server 132, the honey databases 134, and/or the honey profile $P_h$. The honey activity $A_h$ can include activity generated by the multilayer deception system controller 116. The honey activity $A_h$ appears to be real traffic generated by a real user $U_r$, but is actually real or virtual traffic generated by the multilayer deception system controller 116 between the honey computer 128 and the other honey entities shown in FIG. 1, or between the computer 120 and the various honey entities shown in FIG. 1. More particularly, as explained above, the honey computer 128 can be eliminated in some embodiments, and the honey activity $A_h$ therefore can originate at the computer 120 or other device (not shown) instead of, or in addition to, the honey computer 128.

The honey activity $A_h$ includes any traffic corresponding to any activity that may be undertaken by the real user $U_r$. Thus, the honey activity $A_h$ may correspond to interactions with remote servers and/or local servers such as the honey server 132 and/or the server 124. The honey activity $A_h$ also can be created to intercept and/or remediate sophisticated malware attacks such as key loggers, and the like. In particular, the honey activity $A_h$ can obfuscate real keystrokes by providing additional strokes that may be logged by the attack 108 and followed during the exploitation phase of the attack. It should be understood that this embodiment is illustrative, and should not be construed as being limiting in any way.

In practice, the concepts and technologies disclosed herein provide a multilayer deception system that is controlled and/or orchestrated by the multilayer deception system controller 116. The multilayer deception system controller 116 is configured to create and manage honey entities, as well as to monitor and trigger alarms based upon activity with or by the honey entities by other honey entities and/or by real resources. The multilayer deception system controller 116 can be configured to determine a possible target of the attack 108. The target can include high-level employees of an organization or other entities or users within an organization that may be targeted by the attacker 102. The multilayer deception system controller 116 is configured to create a honey user $U_h$ that approximates or mirrors the expected target of the attack 108. As part of creating the honey user $U_h$, the multilayer deception system controller 116 can be configured to create a honey profile $P_h$ that can be exposed to the public to attract or distract the attacker 102. The attacker 102 may direct attacks against the honey user $U_h$ instead of, or in addition to, the real user $U_r$, and therefore can provide a first layer of protection for the real user $U_r$ and his or her resources.

The multilayer deception system controller 116 also can be configured to create honey entities such as, for example, the honey computer 128, the honey files and folders 130, the honey server 132, the honey database 134, and/or the honey activity $A_h$. As explained above, these and other honey entities can be provided by dedicated real and/or virtual resources of the private network 106 and/or can be hosted by real entities associated with the real user $U_r$ such as the computer 120, the files and folders 122, the server 124, and/or the database 126. The multilayer deception system controller 116 also can create honey activity $A_h$ between the various honey entities and/or real resources, if desired. Thus, the multilayer deception system controller 116 can create a multilayer deception system including fake users, fake entities, fake activity between the entities and/or real entities, and even a fake profile, each of which can independently and/or collectively entice attackers 102 to target the fake entities instead of the real entities. Furthermore, even if an attack 108 successfully targets a real entity, the honey entities can be used to trap malicious activity by redirecting the malicious activity from real resources to the honey entities.

According to various embodiments, the attacker 102 launches an attack 108 against the honey user $U_h$. The attack 108 can originate via email or other messaging mechanisms such as SMS, and the like. The private network 106 can be configured to forward messages and/or other content to a honey computer 128 or other device for analysis and/or monitoring. In some embodiments, the private network 106 includes a mail server 118 that forwards messages for the honey user $U_h$ to the multilayer deception system controller 116 for analysis and/or to the honey computer 128 for monitoring. The multilayer deception system controller 116 is configured to block the attack 108 and to propagate information about the attack 108 to other devices or nodes within the private network 106 such as, for example, firewalls, blacklists, and the like. As such, the multilayer deception system controller 116 can block attacks 108 that target the honey user $U_h$.

In some embodiments, the multilayer deception system controller 116 also is configured to monitor the honey entities to reduce false alarms that may be triggered by the honey activity $A_h$. In some embodiments, the multilayer deception system controller 116 monitors the honey entities. When the multilayer deception system controller 116 detects an interaction with one or more of the honey activities, the multilayer deception system controller 116 can determine if a threshold is met. The threshold can be defined by the multilayer deception system controller 116 and can specify, for example, times and/or activity and/or combinations of activity that are associated with the honey activity $A_h$ and/or normal activity of the user $U_r$. If the activity detected by the multilayer deception system controller 116 satisfies one or more specified thresholds, the multilayer deception system controller 116 can determine that the detected interaction corresponds to an attack 108. If the activity is not satisfy one or more specified thresholds, the multilayer deception system controller 116 can determine that the detected interaction is associated with the honey activity $A_h$.

If the multilayer deception system controller 116 determines that an attack 108 is underway, the multilayer deception system controller 116 can trigger an alarm. The multilayer deception system controller 116 also can determine if a threshold adjustment process should be executed. The multilayer deception system controller 116 can determine that the threshold adjustment process is to be completed each time an alarm is received, if an alarm is determined to be false, or at other times. If the multilayer deception system controller 116 determines that the threshold adjustment process is to be completed, the multilayer deception system controller 116 can adjust the threshold(s) and manage alarms, if desired. These and other aspects of the multilayer deception system controller 116 are described in more detail below, at least with reference to FIGS. 2-4.

FIG. 1 illustrates one attacker 102, one public network 104, one private network 106, one SN server 110, one multilayer deception system controller 116, and single instances of the real and honey entities. It should be understood, however, that various implementations of the operating environment 100 include multiple attackers 102, multiple public networks 104, multiple private networks 106, multiple SN servers 110, multiple multilayer deception system controllers 116, and/or multiple instances of the real and honey entities. As such, the illustrated embodiment should be understood as being illustrative, and should not be construed as being limiting in any way.

Figure 2:
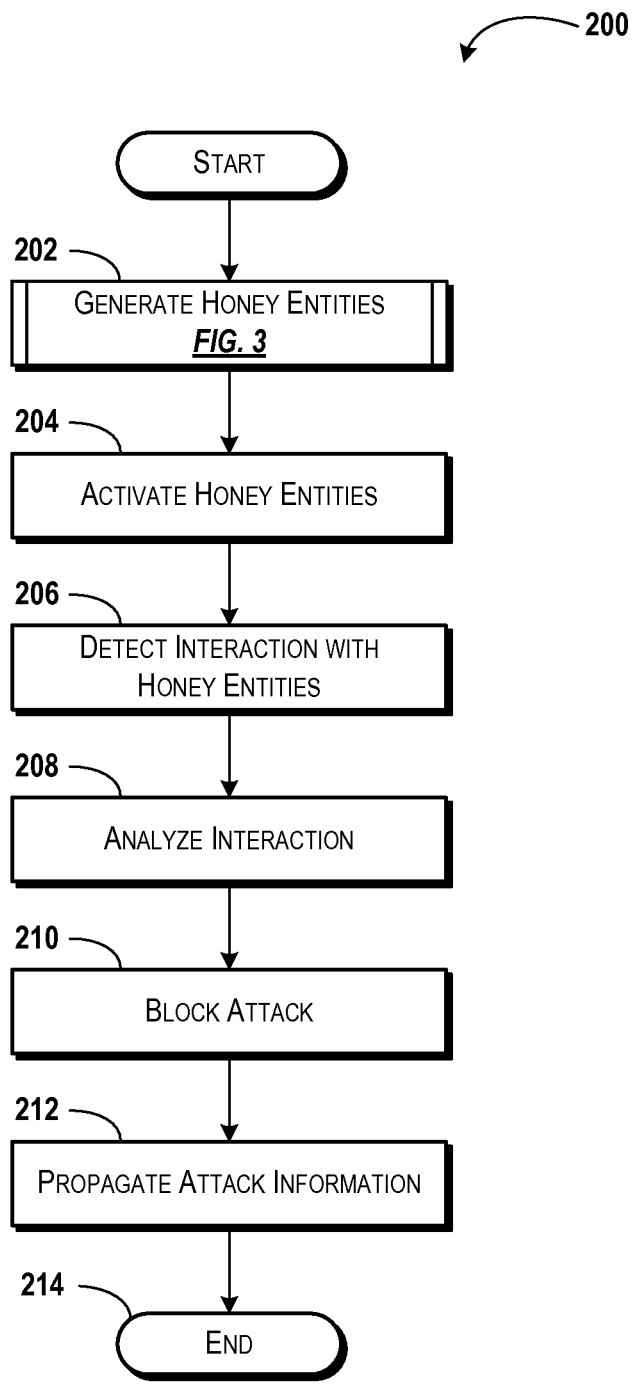
FIG. 2 is a flow diagram showing aspects of a method for providing a multilayer deception system, according to an illustrative embodiment.

Turning now to FIG. 2, aspects of a method 200 for providing a multilayer deception system will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used in the description and claims, is used expansively hereinto include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof.

Figure 6:
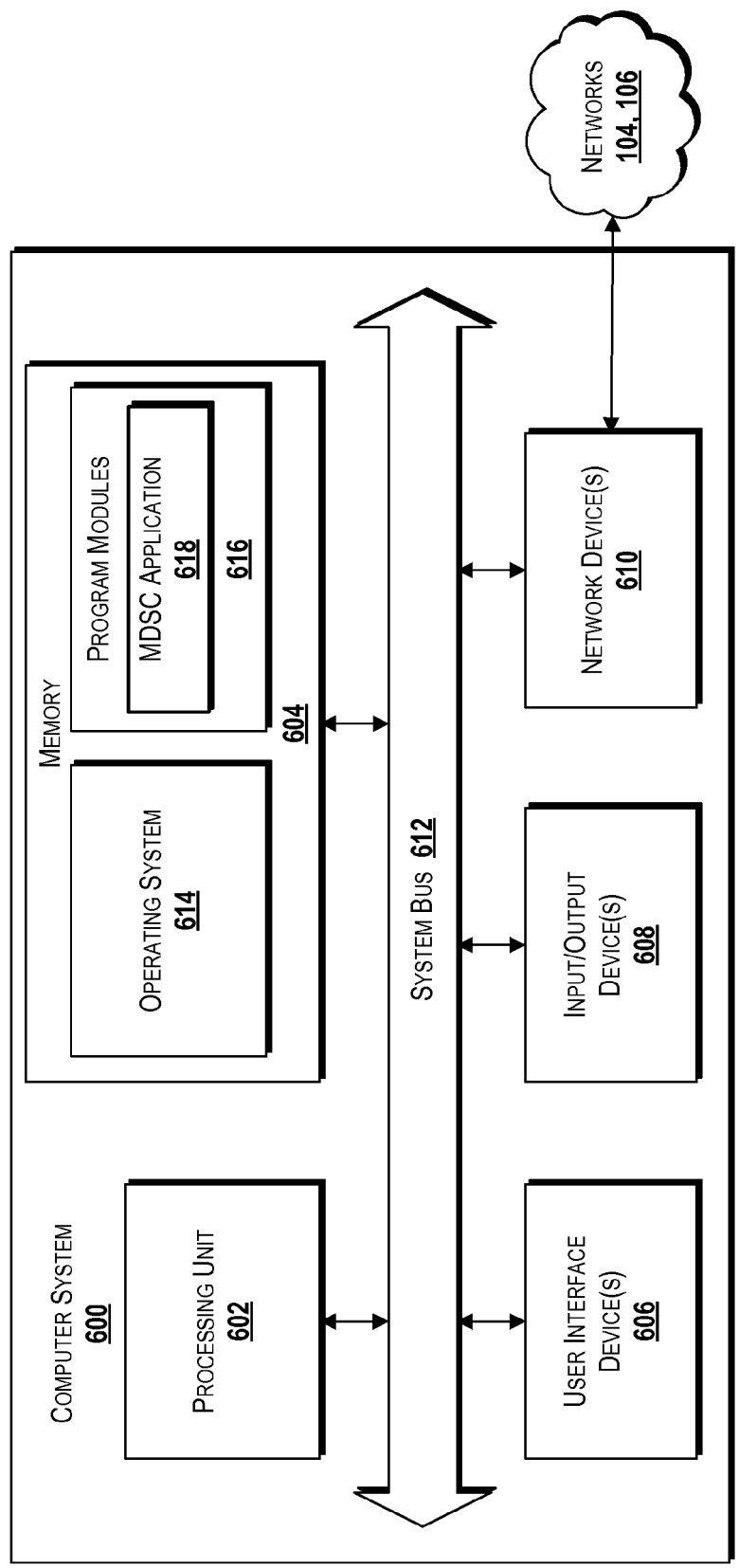
FIG. 6 is a block diagram illustrating an example computer system configured to provide a verification service, according to some illustrative embodiments.

For purposes of illustrating and describing the concepts of the present disclosure, the methods disclosed herein are described as being performed by the multilayer deception system controller 116 via execution of one or more software modules such as, for example, a multilayer deception system controller application (shown in FIG. 6). It should be understood that additional and/or alternative devices and/or network nodes can provide the functionality described herein via execution of one or more modules, applications, and/or other software including, but not limited to, the multilayer deception system controller application. Thus, the illustrated embodiments are illustrative, and should not be viewed as being limiting in any way.

The method 200 begins at operation 202, wherein the multilayer deception system controller 116 creates ("generates") honey entities. As explained above with reference to FIG. 1, the honey entities can include a honey user $U_h$ and/or a honey profile $P_h$ that appears to be a legitimate profile of the honey user $U_h$. The honey entities also can include one or more honey computers 128, one or more honey files and folders 130, one or more honey servers 132, and one or more honey databases 134. The multilayer deception system controller 116 also can create honey activity $A_h$, as explained above in detail with reference to FIG. 1. The creation of the honey entities as depicted in FIG. 2 is illustrated and described in more detail below with reference to FIG. 3.

From operation 202, the method 200 proceeds to operation 204, wherein the multilayer deception system controller 116 activates the honey entities generated in operation 202. In some embodiments, the multilayer deception system controller 116 exposes a honey profile $P_h$ associated with the honey user $U_h$. The honey profile $P_h$ can be exposed by the multilayer deception system controller 116 by uploading or creating a profile at a social networking service such as the SN server 110 hosting a SN application 112, by creating a biography on a company website or portal, and/or via other mechanisms. In one contemplated embodiment, a honey profile $P_h$ is exposed by publishing documents electronically or in tangible form with contact information for a honey users $U_h$. Because other mechanisms for exposing the honey user $U_h$ and/or a honey profile $P_h$ are contemplated, it should be understood that these embodiments are illustrative, and should not be construed as being limiting in any way.

The multilayer deception system controller 116 can activate the other honey entities in various ways. In some embodiments, the multilayer deception system controller 116 creates honey entities on real or virtual resources that are dedicated to providing the honey entities. Thus, for example, a database, a server, a computer, and/or storage capacity can be dedicated to providing a honey database 134, a honey server 132, a honey computer 128, and/or the honey files and folders 130, respectively. In other embodiments, the multilayer deception system controller 116 activates the honey entities by creating the entities on real resources such as, for example, the computer 120, the server 124, the database 126, and/or by adding the honey files and folders 130 to the files and folders 122. It should be understood that these embodiments are illustrative, and should not be construed as being limiting in any way.

From operation 204, the method 200 proceeds to operation 206, wherein the multilayer deception system controller 116 detects an interaction with one or more of the honey entities created in operation 202. According to various embodiments, the honey entities are hosted by real or virtual resources in communication with the multilayer deception system controller 116. Thus, the multilayer deception system controller 116 can receive reports from the honey entities that indicate if any of the honey entities has been accessed or otherwise interacted with. In other embodiments, the multilayer deception system controller 116 monitors activity at the honey activities and therefore can be configured to recognize the interaction without any reporting mechanisms. Because the multilayer deception system controller 116 can detect interactions with the honey entities in a number of ways, it should be understood that this embodiment is illustrative, and should not be construed as being limiting in any way.

From operation 206, the method 200 proceeds to operation 208, wherein the multilayer deception system controller 116 analyzes the interaction with the honey entities. In various embodiments, the multilayer deception system controller 116 is configured to interpret any interaction with the honey entities as malicious activity such as an attack 108. Thus, the multilayer deception system controller 116 can be configured to analyze the interaction to determine how to recognize the attack 108 if directed to other entities or devices on the private network 106.

The analysis of operation 208 can include, for example, analyzing message headers or other source information associated with the interaction, determining a signature of malware conducting the interaction, and/or detecting other functionality associated with the interaction. In some embodiments, for example, an attack 108 commences via a phishing or spear-phishing email. Thus, the analysis of operation 208 can include a detailed analysis of an email that was used to launch an attack 108 in which the interaction was detected to store information relating to the source, timing, contents, and/or other aspects of the email. Because attacks 108 can be launched via various mechanisms, and because the interaction can include other types of interactions with the honey entities, it should be understood that this embodiment is illustrative, and should not be construed as being limiting in any way.

From operation 208, the method 200 proceeds to operation 210, wherein the multilayer deception system controller 116 blocks the attack 108 and/or commands other entities on the private network 106 to block the attack 108. The multilayer deception system controller 116 can use the information determined in operation 208 to block the attack 108 from further progressing. Thus, for example, the multilayer deception system controller 116 can quarantine the attack 108, order other devices in the private network 106 or elsewhere to quarantine the attack, close or restrict ports to the attack 108, and/or take other actions. The multilayer deception system controller also can add source information associated with the attack 108 to IP blacklists, sender blacklists, firewalls, and/or other mechanisms to prevent future attacks 108 from the same attacker 102.

From operation 210, the method 200 proceeds to operation 212, wherein the multilayer deception system controller 116 propagates an attack signature determined during remediation of the attack 108 to other devices in the private network 106 and/or to other entities outside of the private network 106. As such, the multilayer deception system controller 116 can share information associated with the attack 108 with other entities within or remote from the private network 106 to prevent future attacks. Operation 212 can include, in some embodiments, the functionality of operation 210, if desired.

From operation 212, the method 200 proceeds to operation 214. The method 200 ends at operation 214.

Figure 3:
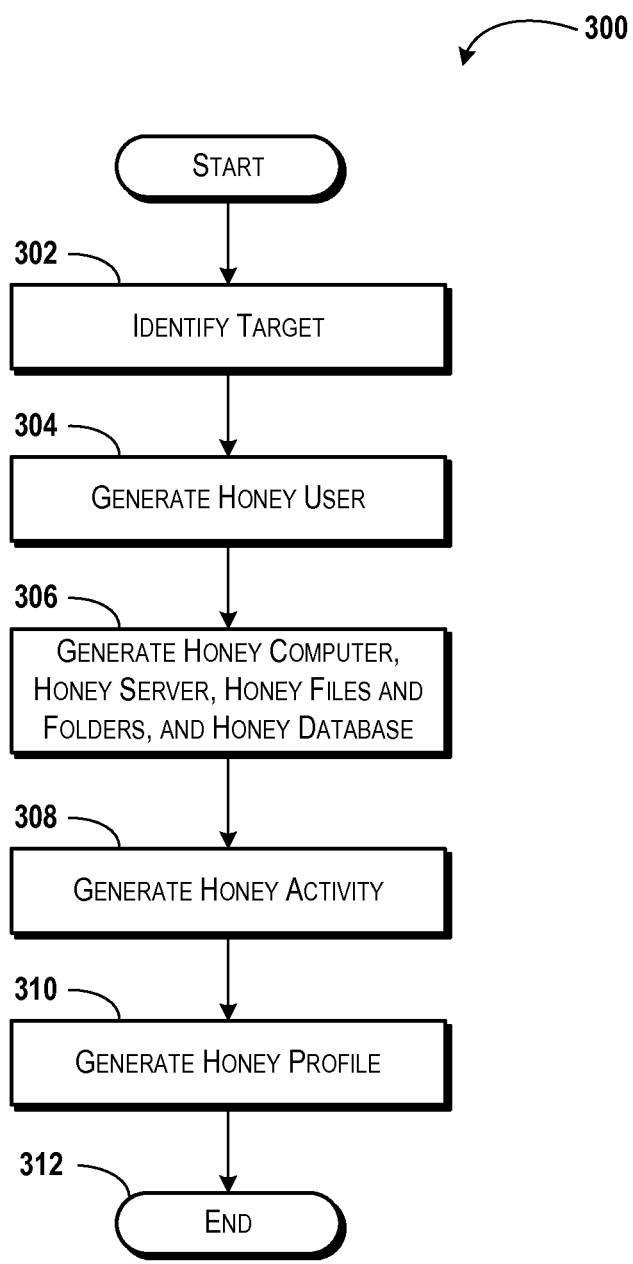
FIG. 3 is a flow diagram showing aspects of a method for creating honey entities, according to another illustrative embodiment.

Turning now to FIG. 3, aspects of a method 300 for creating ("generating") honey entities will be described in detail, according to an illustrative embodiment. It should be understood that the method 300 illustrated in FIG. 3 can, but does not necessarily, correspond to execution of the operation 202 illustrated in FIG. 2. The method 300 begins at operation 302, wherein the multilayer deception system controller 116 identifies a target within or associated with the private network 106. According to some embodiments, the multilayer deception system controller 116 identifies, in operation 302, a user $U_r$ that is determined, by the multilayer deception system controller 116, to be a likely or expected target of an attack 108. The multilayer deception system controller 116 also can identify one or more computers 120, one or more files and folders 122, one or more servers 124, and/or one or more databases 126 that are likely and/or expected to be the target of the attack 108. For purposes of describing the concepts and technologies disclosed herein, the target is described herein as a user $U_r$. Based on the above description of FIGS. 1-2, it can be appreciated that this embodiment is illustrative.

The multilayer deception system controller 116 can identify the user $U_r$; or in some embodiments the computer 120, files and folders 122, server 124, and/or database 126; based upon activity associated with the user $U_r$. The multilayer deception system controller 116 also can identify the target based upon historical trends, "best guess" analysis, posted or published threats, and the like. Because numerous approaches are possible and are contemplated for identifying a target, it should be understood that these embodiments are illustrative, and should not be construed as being limiting in any way.

From operation 302, the method 300 proceeds to operation 304, wherein the multilayer deception system controller 116 creates ("generates") a honey user $U_h$. The honey user $U_h$, as explained above, can mirror or emulate the user $U_r$ identified in operation 302. In particular, the multilayer deception system controller 116 or other entity can create a software representation of the user $U_r$ and treat that software representation as the honey user $U_h$. Thus, the honey user $U_h$ can be used to deceive the attacker 102 to send an attack 108 to the honey user $U_h$ instead of, or in addition to, the real user $U_r$. It should be understood that this embodiment is illustrative, and should not be construed as being limiting in any way.

From operation 304, the method 300 proceeds to operation 306, wherein the multilayer deception system controller 116 creates ("generates") the other honey entities. According to various embodiments, as can be appreciated from the description of FIG. 1 above, the honey entities created in operation 306 can, but do not necessarily, include one or more honey computers 128, honey files and folders 130, honey servers 132, honey databases 134, and/or other honey entities. As noted above, the honey computer 128 is optional, and therefore can be omitted, if desired, or the functionality thereof can be provided by the computer 120.

From operation 306, the method 300 proceeds to operation 308, wherein the multilayer deception system controller 116 creates ("generates") the honey activity $A_h$. The honey activity $A_h$ can include activity between the various honey entities created in operation 306. In some embodiments, the honey activity $A_h$ originates at the computer 120 and terminates at the various honey entities generated in operation 304. In other embodiments, the honey activity $A_h$ originates and terminates within the various honey entities generated in operation 304. The honey activity $A_h$ can emulate real activity $A_r$ of the user $U_r$. Thus, if the attack 108 is successfully routed to the real resources and the honey entities, the attack 108 can monitor and/or report the honey activity $A_h$ instead of searching for and/or identifying the real activity $A_r$. Also, the attack 108 can be tricked into attacking honey entities instead of the real entities based upon detecting the honey activity $A_h$. Thus, the honey activity can add a layer of obfuscation to the multilayer deception system by way of including fake activity to deceive attackers 102 and/or attacks 108.

In some embodiments, the honey activity $A_h$ includes, but is not limited to, activity representing accessing the honey files and folders 130. Thus, the honey activity $A_h$ can include activity originating at the computer 120 and/or the honey computer 128 and terminating at one or more of the honey files and folders 130. In other embodiments, the honey activity $A_h$ includes accessing the honey servers 132 and/or the honey database 134. Other activities can be embodied by the honey activity $A_h$. The honey activity $A_h$ can appear, to the attacker 102 and/or the attack 108, to be legitimate activity of the user $U_r$. In reality, however, the honey activity $A_h$ can include interactions with honey entities that, if repeated by the attack 108, trigger alarms, reveal little or no sensitive data, and/or can be contained by the multilayer deception system controller 116.

From operation 308, the method 300 proceeds to operation 310, wherein the multilayer deception system controller 116 generates a honey profile $P_h$. As explained above in detail with reference to FIG. 1, the honey profile $P_h$ can correspond to the honey user $U_h$ created in operation 304. The honey profile $P_h$ can include biographical and/or professional information that mirrors, emulates, and/or is even identical to a real profile $P_r$ of the user $U_r$. As such, an attacker 102 reviewing the honey profile $P_h$ may identify the honey user $U_h$ as a target for an attack 108. Thus, the multilayer deception system controller 116 can remediate or redirect attacks 108 from the attacker 102, as explained above with reference to FIGS. 1-2.

From operation 310, the method 300 proceeds to operation 312. The method 300 ends at operation 312.

Figure 4:
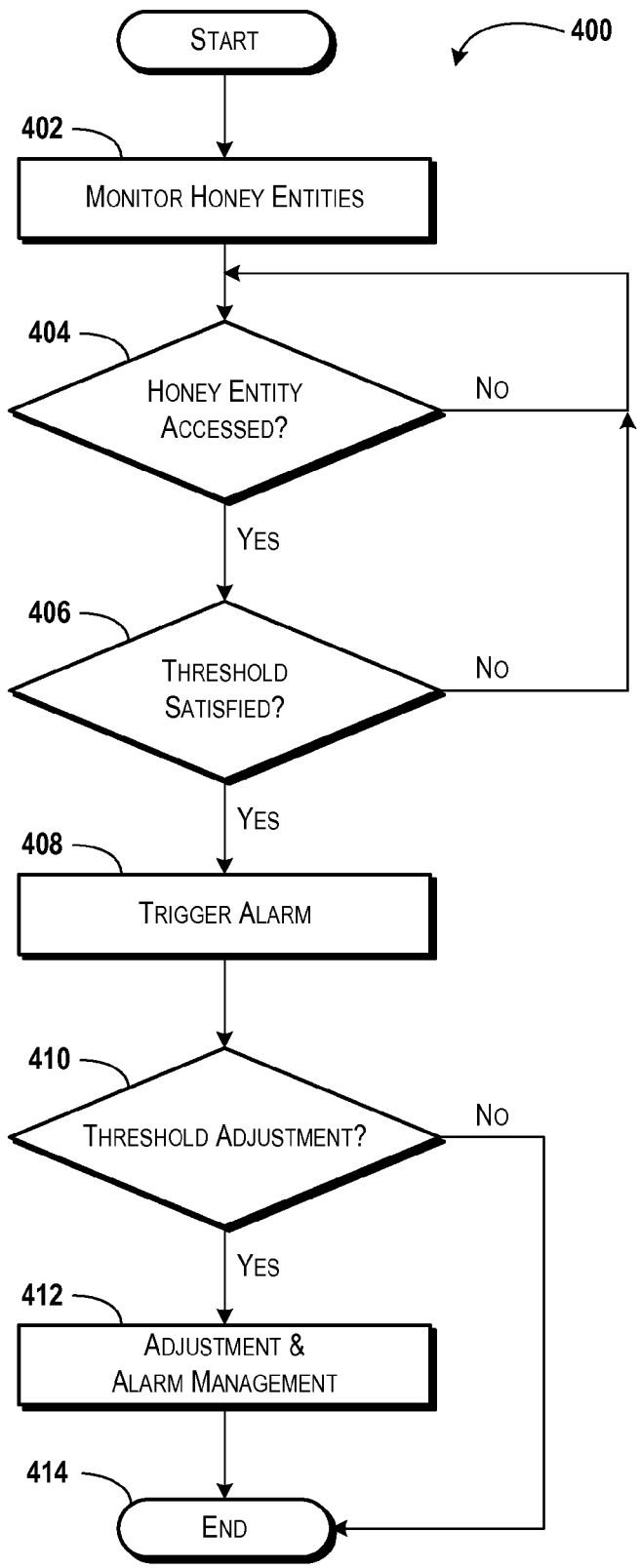
FIG. 4 is a flow diagram showing aspects of a method for managing false alarms in a multilayer deception system, according to another illustrative embodiment.

Turning now to FIG. 4, aspects of a method 400 for managing false alarms in a multilayer deception system will be described in detail, according to an illustrative embodiment. In some embodiments, the functionality described herein with reference to FIG. 4 can be, but is not necessarily, provided by the multilayer deception system controller 116 during execution of the operations 206-208 of FIG. 2. The method 400 begins at operation 402, wherein the multilayer deception system controller 116 monitors the honey entities.

As explained above, in some embodiments the multilayer deception system controller 116 is configured to monitor traffic originating or terminating at any of the honey entities. In other embodiments, the multilayer deception system controller 116 is configured to receive reports from the honey entities indicating any activity or interactions at the honey activity. In yet other embodiments, the honey activities correspond to fake entities, and as such, any interactions with the honey entities can be determined to be malicious. In yet another embodiment, the mail server 118 is configured to inform the multilayer deception system controller 116 if an email is received for an email address included in a honey profile $P_h$. Because the multilayer deception system controller 116 can monitor the honey entities in a number of ways not described herein, it should be understood that these embodiments are illustrative, and should not be construed as being limiting in any way.

From operation 402, the method 400 proceeds to operation 404, wherein the multilayer deception system controller 116 determines if a honey entity has been accessed. In some embodiments, the multilayer deception system controller 116 pauses execution of the method 400 until one of the honey entities is accessed. In other embodiments, as shown in FIG. 4, if the multilayer deception system controller 116 determines, in operation 404, that one or more of the honey entities has not been accessed or otherwise interacted with, the method 400 can return to operation 404. It should be understood that this embodiment is illustrative, and should not be construed as being limiting in any way.

If the multilayer deception system controller 116 determines, in operation 404, that one or more of the honey entities has been accessed or otherwise interacted with, the method 400 proceeds to operation 406. In operation 406, the multilayer deception system controller 116 determines if an access threshold is satisfied. As explained above with reference to FIG. 1, the multilayer deception system controller can define thresholds for access. The thresholds can define types, times, and/or other aspects of activity with the honey entities that are tolerated and/or expected. For example, the thresholds can be configured to prevent or reduce the probability that the honey activity $A_h$ will trigger an alert or alarm.

The thresholds can define, for example, times of day at which interactions with the honey entities indicate or do not indicate an attack 108, frequency of activity that indicates or does not indicate an attack 108, and/or the like. In some embodiments, the thresholds specify that any access or interaction with some honey entities indicate an attack 108. These thresholds can be defined by users and/or by the multilayer deception system controller 116.

If the multilayer deception system controller 116 determines, in operation 406 that an access threshold is not satisfied for the activity or interaction detected in operation 404, the method 400 can return to operation 404, and the multilayer deception system controller 116 can wait for another interaction. Alternatively, though not illustrated in FIG. 4, the method 400 can end.

If the multilayer deception system controller 116 determines, in operation 406, that an access threshold is satisfied, the method 400 proceeds to operation 408. In operation 408, the multilayer deception system controller 116 can trigger an alarm. The alarm can be used by other entities, devices, or nodes to remediate the attack 108 and/or for other purposes.

From operation 408, the method 400 proceeds to operation 410, wherein the multilayer deception system controller 116 determines if a threshold adjustment is to be made. The multilayer deception system controller 116 can determine, based upon an analysis of the interaction detected in operation 404 that the interaction correspond to honey activity $A_h$, for example, or otherwise does not represent malicious activity. In such embodiments, the multilayer deception system controller 116 can determine that one or more of the thresholds are to be adjusted. If the multilayer deception system controller 116 determines that the one or more thresholds are not to be adjusted, the method 400 can end. Although not shown in FIG. 4, the method 400 also can return to operation 404, if desired.

If the multilayer deception system controller 116 determines, in operation 410, that a threshold adjustment is to be made, the operation 400 proceeds to operation 412. At operation 412, the multilayer deception system controller 116 adjusts the thresholds and/or manages alarms generated in operation 408. The multilayer deception system controller 116 can adjust the thresholds to avoid alarm conditions in the future if the action that triggered the alarm in operation 408 is determined not to be malicious. The thresholds can be adjusted to ignore non-malicious activity and to thereby enhance the performance of the multilayer deception system controller 116 by reducing false alarms.

From operation 412, the method 400 proceeds to operation 414. As noted above, the method 400 also can proceed to operation 414 if the multilayer deception system controller 116 determines, in operation 410, that no threshold adjustment is to be made. The method 400 ends at operation 414.

According to various embodiments of the concepts and technologies disclosed herein, the multiple layers of deception provided by the various honey entities are configured to detect an attack 108 with some probability at each stage of the attack 108. Each of the honey entities can be considered as a layer of the multilayer deception system, can operate independently and/or in conjunction with one another, and can, but does not necessarily, correspond to real entities. As is generally understood, an attacker 102 often takes multiple steps to launch an attack 108. For example, the attacker 102 first enters a network, then infects a machine, then exports data, etc. Thus, various embodiments of the concepts and technologies disclosed herein provide that even if the attacker 102 manages to avoid one layer of protection provided by the multilayer deception system, e.g., one of the honey entities, another layer or honey entity may catch the attacker 102 at a later phase of the attack 108.

In one contemplated example, an attacker 102 browses a social networking site such as a social networking service provided by the SN server 110. The attacker 102 determines that a real user $U_r$ works at a company, for example, a company that handles customer data. The attacker 102 may determine that the real user $U_r$ has specific work experience that would most likely include having access to data the attacker 102 wants to access. The attacker 102 obtains an email address of the user $U_r$ and sends a phishing email to the user $U_r$. The user $U_r$ opens the email with a computer such as the computer 120, and the computer 120 is infected with malware remotely controlled by the attacker 102. From here, the attacker 102 is able to monitor electronic activity of the user $U_r$ and may determine that the user $U_r$ accesses a specific server 124, database 126, files and folders 122, and/or other resources on his computer 120 and/or in communication with the computer 120. On the server 124, the attacker 102 may determine that the user $U_r$ queries specific databases 126 and/or access data stored at the databases 126, in this example, the data on the database 126 can include customer data. Thus, the attacker 102 can navigate to the server 124, access the database 126, and exfiltrate some or all of the data.

According to various embodiments of the concepts and technologies disclosed herein, the multilayer deception system disclosed herein provides multiple layers where the above attack 108 can be avoided, detected, mitigated, and/or blocked. For example, if the profile of the user $U_r$ targeted by the attacker 102 is actually a honey profile $P_h$ as disclosed herein, the attacker 102 sends a message to an email address that is being monitored by the multilayer deception system controller 116 instead of the email address of the user $U_r$. Thus, the attack 108 can be avoided if the attacker 102 uses the honey profile $P_h$ to launch an attack.

If the profile located by the attacker 102 corresponds to a real profile $P_r$ of the user $U_r$, the attacker 102 may get past the first layer of protection and the computer 120 of the user $U_r$ may thus be infected. Thus, the attack 108 may begin searching the computer 120 to find what data should be exfiltrated. As such, various embodiments of the concepts and technologies disclosed herein include the generation and usage of honey activity $A_h$ that obfuscates real activity $A_r$ of the user $U_r$. Furthermore, embodiments include generation and activation of other honey entities such as the honey files and folders 130 on the computer 120 and/or on a honey computer 128 that the malware associated with the attack 108 may identify during a random search for data. Furthermore, the honey activity $A_h$ may trick the attack 108 into opening one of the honey files and folders 130. Any access of the honey files and folders 130 may be understood by the multilayer deception system controller 116 as an attack 108 and can be acted against to mitigate or block the attack 108.

In various embodiments, multiple honey servers 132 can also be included to lure the attacker 102 or attack 108 to connect to an IP address associated with the honey servers 132, thereby triggering an alarm. Embodiments also include additional layers of protection that can be provided by the honey files and folders 130 and/or the honey databases 134. Thus, even if the attacker 102 or the attack 108 successfully navigates to a real server 124, the server 124 can host or connect to the honey files and folders 130 and/or the honey database 134 to again lure the attacker 102 or attack 108 away from the real files and folders 122 and/or database 126.

It can be appreciated from the above description that in some embodiments, each of the honey entities can provide an independent layer of protection. In other embodiments, the honey entities can cooperate to provide multiple interconnected layers of protection. In various embodiments, any access of the honey entities described herein can trigger an alarm.

Although not described in detail above, each of the honey entities can include further functionality for providing the various features described herein. For example, in some embodiments, each of the honey entities includes a deception service controller on the device that provides the honey entity. The deception service controller is configured to manage the honey entity. Thus, for example, if a computer 120 hosts honey activity $A_h$ and/or honey files and folders 130, the computer 120 also can host or execute a deception service controller to manage these honey entities. According to various embodiments, the deception service controller on the computer 120 is configured to communicate with the multilayer deception system controller 116 in the private network 106 that monitors alarms and states of devices on the private network 106. The multilayer deception system controller 116 also can be configured to push commands to the deception service controller to add or create honey activity $A_h$, a honey database 134, a honey server 132, and/or honey files and folders 130.

Figure 5:
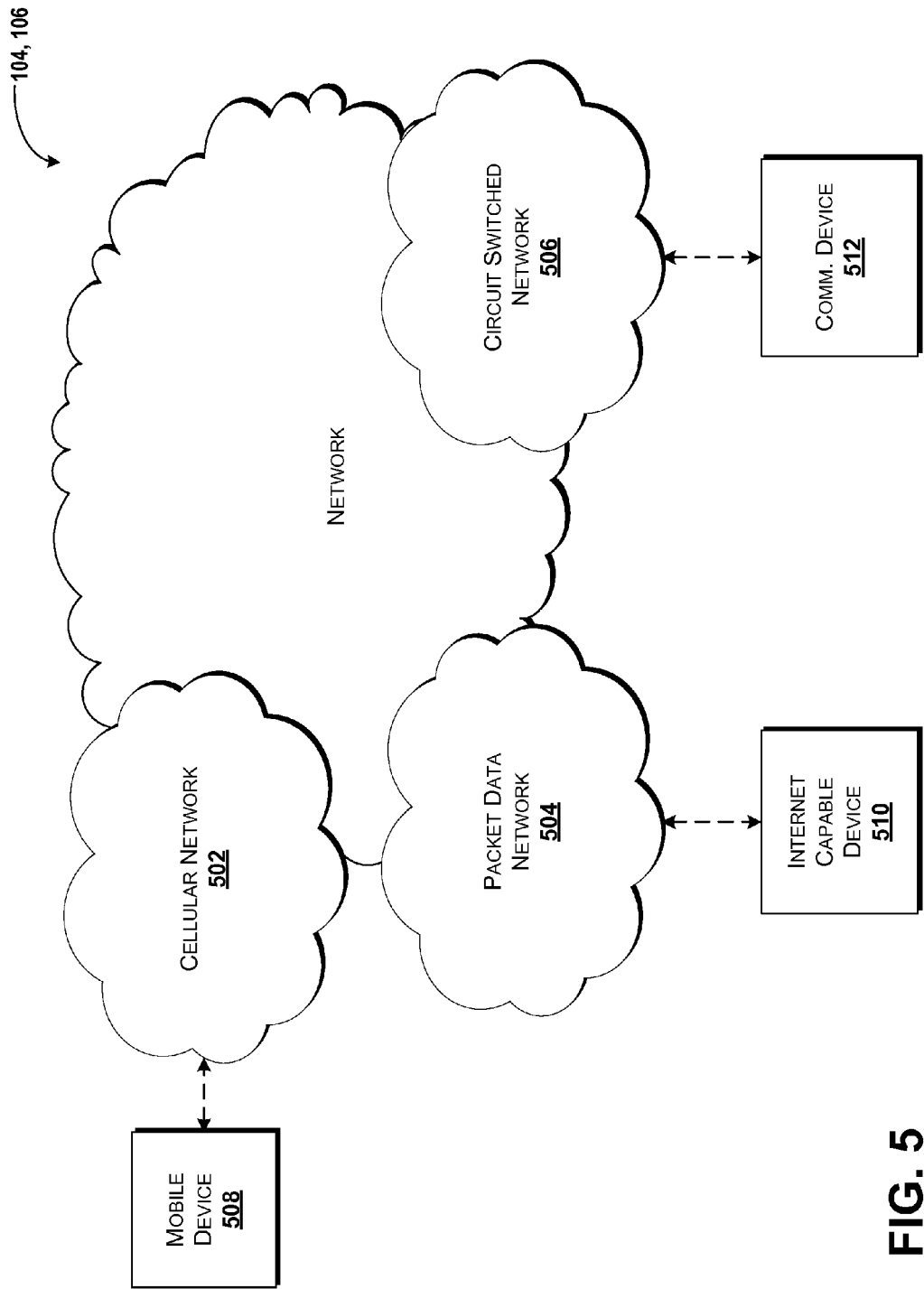
FIG. 5 schematically illustrates a network, according to an illustrative embodiment.

Turning now to FIG. 5, additional details of the networks 104, 106 are illustrated, according to an illustrative embodiment. The networks 104, 106 include a cellular network 502, a packet data network 504, for example, the Internet, and a circuit switched network 506, for example, a publicly switched telephone network ("PSTN"). The cellular network 502 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 502 also includes radios and nodes for receiving and transmitting voice, data, and combinations thereof to and from radio transceivers, networks, the packet data network 504, and the circuit switched network 506.

A mobile communications device 508, such as, for example, a cellular telephone, a user equipment, a mobile terminal, a PDA, a laptop computer, a handheld computer, and combinations thereof, can be operatively connected to the cellular network 502. The cellular network 502 can be configured as a 2G GSM network and can provide data communications via GPRS and/or EDGE. Additionally, or alternatively, the cellular network 502 can be configured as a 3G UMTS network and can provide data communications via the HSPA protocol family, for example, HSDPA, EUL (also referred to as HSUPA), and HSPA+. The cellular network 502 also is compatible with 4G mobile communications standards as well as evolved and future mobile standards.

The packet data network 504 includes various devices, for example, servers, computers, databases, and other devices in communication with another, as is generally known. The packet data network 504 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 504 includes or is in communication with the Internet. The circuit switched network 506 includes various hardware and software for providing circuit switched communications. The circuit switched network 506 may include, or may be, what is often referred to as a plain old telephone system (POTS). The functionality of a circuit switched network 506 or other circuit-switched network are generally known and will not be described herein in detail.

The illustrated cellular network 502 is shown in communication with the packet data network 504 and a circuit switched network 506, though it should be appreciated that this is not necessarily the case. One or more Internet-capable devices 510, for example, a PC, a laptop, a portable device, or another suitable device, can communicate with one or more cellular networks 502, and devices connected thereto, through the packet data network 504. It also should be appreciated that the Internet-capable device 510 can communicate with the packet data network 504 through the circuit switched network 506, the cellular network 502, and/or via other networks (not illustrated).

As illustrated, a communications device 512, for example, a telephone, facsimile machine, modem, computer, or the like, can be in communication with the circuit switched network 506, and therethrough to the packet data network 504 and/or the cellular network 502. It should be appreciated that the communications device 512 can be an Internet-capable device, and can be substantially similar to the Internet-capable device 510. In the specification, the public network 104 is used to refer broadly to any combination of the networks 502, 504, 506. It should be appreciated that substantially all of the functionality described with reference to the public network 104 can be performed by the cellular network 502, the packet data network 504, and/or the circuit switched network 506, alone or in combination with other networks, network elements, and the like. Similarly, the functionality of the private network 106 can be provided by any combination of the networks 502, 504, and/or 506.

According to various implementations, the attacker 102 can use any combination of the devices disclosed herein including, but not limited to, the mobile device 508, the Internet capable device 510, and/or the communication device 512 to launch the attack 108 against a target on the private network 106, to access the SN server 110 to obtain the SN data 114, to send messages, emails, and/or other attacks 108 to the target, and/or for other interactions between the attacker 102 and the target. As such, it should be understood that the attacker 102, the SN server 110, the multilayer deception system controller 116, and/or the mail server 118 can interact with one another via any number and/or combination of devices and/or networks.

FIG. 6 is a block diagram illustrating a computer system 600 configured to provide the functionality described herein for a multilayer deception system controller 116, in accordance with various embodiments of the concepts and technologies disclosed herein. The computer system 600 can be configured to provide the functionality of any of the software components described herein for providing a multilayer deception system. The computer system 600 includes a processing unit 602, a memory 604, one or more user interface devices 606, one or more input/output ("I/O") devices 608, and one or more network devices 610, each of which is operatively connected to a system bus 612. The bus 612 enables bi-directional communication between the processing unit 602, the memory 604, the user interface devices 606, the I/O devices 608, and the network devices 610.

The processing unit 602 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein.

The memory 604 communicates with the processing unit 602 via the system bus 612. In some embodiments, the memory 604 is operatively connected to a memory controller (not shown) that enables communication with the processing unit 602 via the system bus 612. The memory 604 includes an operating system 614 and one or more program modules 616. The operating system 614 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 616 may include various software and/or program modules described herein. In some embodiments, for example, the program modules 616 include an multilayer deception system controller application 618. This and/or other programs can be embodied in computer-readable media containing instructions that, when executed by the processing unit 602, perform one or more of the methods 200, 300, 400 described in detail above with respect to FIGS. 2-4. According to embodiments, the program modules 616 may be embodied in hardware, software, firmware, or any combination thereof. Although not shown in FIG. 6, it should be understood that the memory 604 also can be configured to store the honey entities and/or other data, if desired.

By way of example, and not limitation, computer-readable media may include any available computer storage media or communication media that can be accessed by the computer system 600. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 600. In the claims, the phrase "computer storage medium" and variations thereof, does not include waves, signals, and/or other transitory and/or intangible communication media, per se.

The user interface devices 606 may include one or more devices with which a user accesses the computer system 600. The user interface devices 606 may include, but are not limited to, computers, servers, personal digital assistants, cellular phones, or any suitable computing devices. The I/O devices 608 enable a user to interface with the program modules 616. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, or an electronic stylus. Further, the I/O devices 608 may include one or more output devices, such as, but not limited to, a display screen or a printer.

The network devices 610 enable the computer system 600 to communicate with other networks or remote systems via a network, such as the private network 106 and/or the public network 104. Examples of the network devices 610 include, but are not limited to, a modem, a radio frequency ("RF") or infrared ("IR") transceiver, a telephonic interface, a bridge, a router, or a network card. The networks 104, 106 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the networks 104, 106 may be one or more, or a combination of wired network such as, but not limited to, a WAN such as the Internet, a LAN, a PAN, a wired Metropolitan Area Network ("MAN"), and/or other networks.

Based on the foregoing, it should be appreciated that systems and methods for multilayered deception for intrusion detection have been disclosed herein. Although the subject matter presented herein has been described in language specific to computer structural features, methodological and transformative acts, specific computing machinery, and computer-readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the embodiments, which is set forth in the following claims.

We claim:

1. A method comprising:
generating, by a processor executing a multilayer deception system controller application, a plurality of honey entities and an instance of honey activity associated with one honey entity of the plurality of honey entities at a private network, the plurality of honey entities including a honey profile for a honey user, the honey profile being based on a real profile of a real user, wherein the real profile comprises a first version of contact information, and wherein the honey profile comprises a second version of contact information;
exposing, by the processor, the honey profile outside of the private network;
detecting, by the processor, an interaction with the one honey entity of the plurality of honey entities; and
analyzing, by the processor, the interaction to determine if the interaction corresponds to an electronic attack.

2. The method of claim 1, wherein the real user is associated with the private network.

3. The method of claim 1, wherein exposing the honey profile comprises uploading information associated with the honey profile to a social networking service.

4. The method of claim 1, wherein generating the plurality of honey entities comprises generating a honey server at the private network.

5. The method of claim 1, wherein the instance of honey activity comprises activity between the one honey entity of the plurality of honey entities and a computer operating on the private network.

6. The method of claim 5, wherein the computer comprises a honey computer isolated from the real user, wherein the electronic attack comprises an incoming spear-phishing email, and wherein the incoming spear-phishing email is routed by a mail server to a multilayer deception system controller that monitors an email address associated with the honey profile.

7. The method of claim 1, further comprising:
determining if an interaction threshold is satisfied by the interaction; and
in response to determining that the interaction threshold is satisfied, determining that the interaction corresponds to the electronic attack, triggering an alarm indicating that the electronic attack is in progress, blocking the electronic attack, and propagating information relating to the electronic attack to a further entity within the private network.

8. The method of claim 7, further comprising:
determining if the interaction threshold is to be adjusted based upon a determination that the alarm comprises a false alarm.

9. The method of claim 1, wherein the instance of honey activity comprises virtual traffic.

10. The method of claim 1, wherein the honey profile is generated in response to determining that the real user is a target of an attacker.

11. A system comprising:
a processor; and
a memory that stores computer-executable instructions that, when executed by the processor, cause the processor to perform operations comprising
in response to identifying a real user as a target of an attacker, generating a plurality of honey entities and an instance of honey activity associated with one honey entity of the plurality of honey entities at a private network, the plurality of honey entities comprising a honey profile for a honey user, the honey profile being based on a real profile of the real user, wherein the honey profile comprises a first version of contact information, and wherein the real profile comprises a second version of contact information,
exposing the honey profile outside of the private network,
detecting an interaction with the one honey entity of the plurality of honey entities, and
analyzing the interaction with the one honey entity of the plurality of honey entities to determine if the interaction corresponds to an electronic attack by the attacker.

12. The system of claim 11, wherein exposing the honey profile comprises uploading the honey profile to a social networking service.

13. The system of claim 11, wherein the computer-executable instructions, when executed by the processor, cause the processor to perform operations further comprising:
instructing a mail server associated with the private network to route communications directed to an email address associated with the honey profile to a multilayer deception system controller that monitors the email address.

14. The system of claim 11, wherein the computer-executable instructions, when executed by the processor, cause the processor to perform operations further comprising:
triggering an alarm, in response to determining that the interaction corresponds to the electronic attack.

15. The system of claim 11, wherein analyzing the interaction comprises:
determining if an interaction threshold is satisfied by the interaction; and
in response to determining that the interaction threshold is satisfied,
determining that the interaction corresponds to the electronic attack,
blocking the electronic attack, and
propagating information relating to the electronic attack to a further entity within the private network.

16. The system of claim 11, wherein analyzing the interaction comprises:
determining if an interaction threshold is satisfied by the interaction;
determining that that the interaction threshold is to be adjusted based upon determining that the interaction threshold is satisfied and determining that the interaction does not correspond to the electronic attack.

17. A computer storage medium having computer-executable instructions stored thereon that, when executed by a processor, cause the processor to perform operations comprising:
in response to determining that a real user of a private network is a target of an attacker, generating a plurality of honey entities and an instance of honey activity associated with one honey entity of the plurality of honey entities at the private network, the plurality of honey entities comprising a honey profile for a honey user, the honey profile being based on a real profile of the real user, wherein the honey profile comprises a first version of contact information, and wherein the real profile comprises a second version of contact information;
exposing the honey profile outside of the private network;
detecting an interaction with one honey entity of the plurality of honey entities; and
analyzing the interaction with the one honey entity of the plurality of honey entities to determine if the interaction corresponds to an electronic attack by the attacker.

18. The computer storage medium of claim 17, wherein exposing the honey profile comprises uploading the honey profile to a social networking service.

19. The computer storage medium of claim 17, wherein the computer-executable instructions, when executed by the processor, cause the processor to perform operations further comprising:
instructing a mail server operating in communication with the private network to route a message intended for an email address associated with the honey profile to a honey computer;
detecting routing of the message to the honey computer;
analyzing the message to determine if the message comprises the electronic attack; and
triggering an alarm, in response to determining that the message comprises the electronic attack.

20. The computer storage medium of claim 19, wherein the computer-executable instructions, when executed by the processor, cause the processor to perform operations further comprising:
blocking the electronic attack; and
propagating information associated with the electronic attack to other entities associated with the private network.

* * * * *